Patented Feb. 5, 1929.

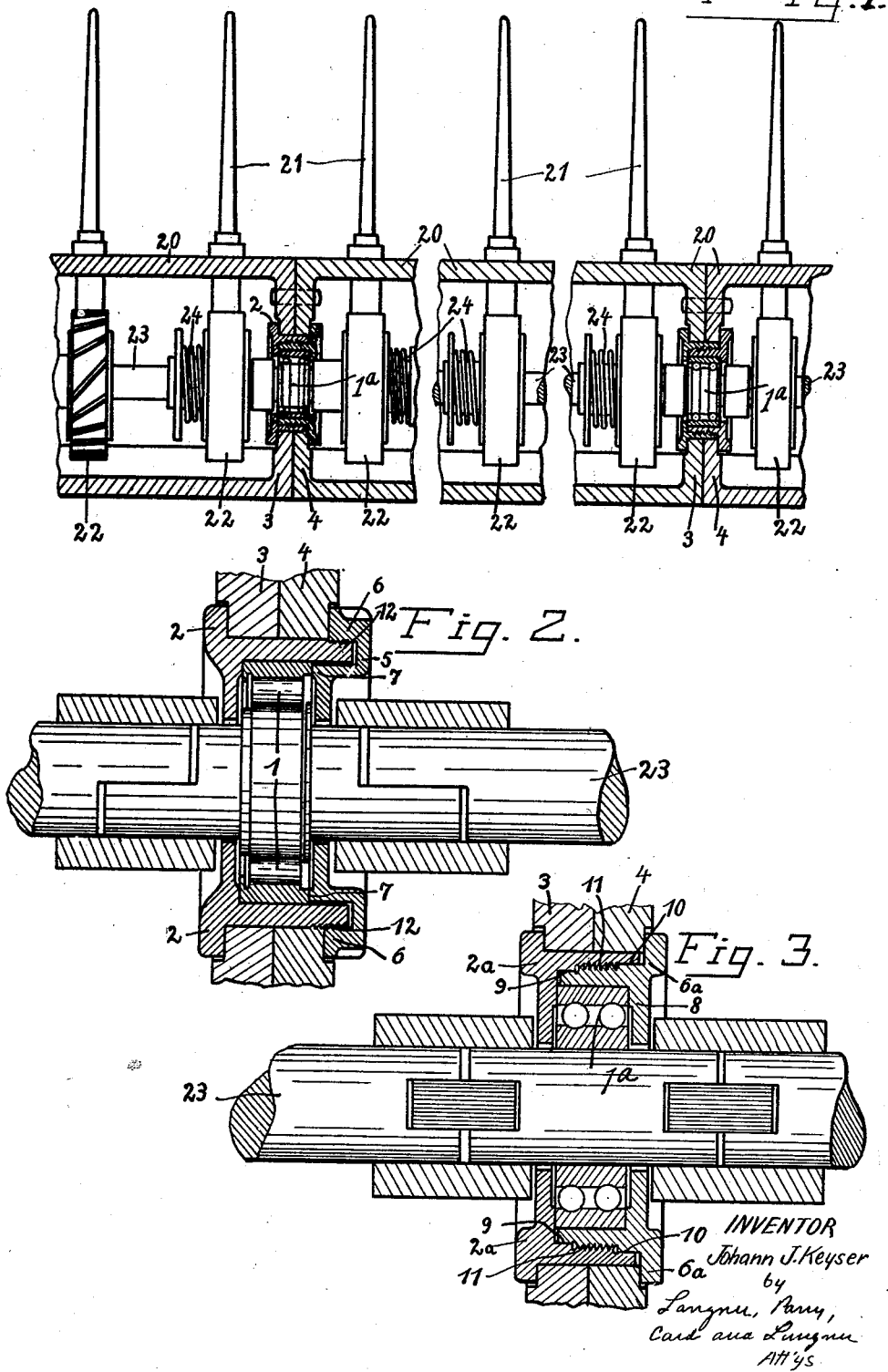

1,700,800

UNITED STATES PATENT OFFICE.

JOHANN JACOB KEYSER, OF AARAU, SWITZERLAND.

SPINNING AND TWISTING MACHINE BEAM.

Application filed July 6, 1927, Serial No. 203,853, and in Germany July 12, 1926.

This invention is concerned with an improved bearing of the driving shafts of spinning, twisting and the like machinery having worm gear actuated spindles. In my co-pending application Serial No. 38,893 of June 22, 1925, I have disclosed a bearing structure for this type of machinery at which the beam sections are centered and aligned by the shaft supporting ball or roller bearings seated directly within the beam section castings and at which the beam sections are held together by special screws. These screws are however not readily accessible on account of the narrowness of the bearing beam and are frequently the cause of any kind of inconveniences, when the beam sections are assembled.

My present invention tends to do away with these drawbacks and provides for this purpose a two-sectional casing for the ball or roller bearings, the sections of the said casing having a screw threaded engagement and constituting a mechanism for centering and aligning the beam sections when the casing sections are drawn together. The relative rotation of the beam sections can with this improved construction be prevented by the usual stop pins.

In the drawing illustrating two embodiment of my invention

Fig. 1 is a transverse section of a sectional bearing beam showing the ball bearings at the interconnection of the beam sections.

Fig. 2 is a section of a roller bearing connection,

Fig. 3 is a section of a ball bearing connection having two rows of balls.

According to Fig. 1 the bearing beam is subdivided into a plurality of beam sections 20 carrying the spindles 21. The spindles 21 are actuated by worm gears 22 carried on the actuating shaft 23 and having a friction clutch connection 24 therewith. The beam sections 20 are provided with end walls 3 and 4 with which they mutually contact.

According to Fig. 2 the shaft 23 is supported in and by the end walls 3 and 4 by means of roller bearings 1, not however immediately but by means of an annular casing 2 having itself a tight fit with the bore of the end walls 3 and 4. For holding the roller bearing 1 within the annular casing 2 I arrange a screw cap 5 engaging the end wall 4 with its marginal or peripheral portion 6. I arrange between the inner face 7 of cap 5 and the roller bearing a small clearance so that by the tightening of the cap 5 on the casing the end walls 3 and 4 are pressed upon each other without the roller bearing being clamped or jammed however.

With this embodiment the casing 2 must project with its thread portion 12 over the end wall 4 in order that the cap may be screwed on. This construction accordingly requires comparatively large space so that it is not very practical if the spindles 21 are arranged at small distances.

In order that the width or axial extension necessary for the mounting of the annular casing of the roller or ball bearing may be reduced as much as possible, I locate according to the embodiment Fig. 3 the ball bearing $1^a$ within the cap 8 instead of in the casing $2^a$. This cap 8 is provided with two cylindrical guiding surfaces 9 and 10 between which the screw thread 11 is arranged. By these guide surfaces 9 and 10 the cap is exactly held in corresponding guide surfaces of the casing $2^a$ so that it is exactly centered within the casing $2^a$ in independence from the screw thread 11. The cap 8 again bears with its rim $6^a$ against the wall 4 so that the casing $2^a$ and the cap 8 may again be used for the contraction of the bearing beam sections as in the case of the embodiment Fig. 2.

I claim:

1. A beam for machines of the character described comprising a plurality of beam sections having a face to face contact, a shaft extending through the said beam sections and having a support at the joints thereof, worm gears on the said shaft for the actuation of spindles, bearings adapted to center and align the said beam sections and intermediate members between the said bearings and the end walls of their coordinated beam sections and constituting means for drawing adjacent beam sections together.

2. A beam for machines of the character described comprising a plurality of beam sections having a face to face contact, a spindle actuating shaft extending through the said beam sections, bearings for the said shaft arranged within the adjoining end walls of either pair of adjacent beam sections, and annular casings between the said bearings and the end walls of their coordinated beam sections adapted to center and align the beam sections and constituting means for drawing adjacent beam sections together.

3. A beam for machines of the character described comprising a plurality of beam sections having a face to face contact, a spindle actuating shaft extending through the said beam sections and comprising a plurality of shaft sections arranged within the beam sections, bearings for the said shaft arranged within the adjoining end walls of adjacent beam sections, annular casings between the said bearings and the end walls of their co-ordinated beam sections for centering and aligning the beam sections and shaft sections and constituting means for drawing adjacent beam sections together, coupling members carried by the said bearing intermediate the individual shaft sections and adapted to unite them into one continuous and aligned shafting and means for locking the shaft sections and coupling members in their coupling position.

4. A beam for machines of the character described comprising a plurality of beam sections having a face to face contact, a spindle actuating shaft extending through the said beam sections, bearings for the said shaft arranged within the adjoining end walls of either pair of adjacent beam sections and annular casings between the said bearings and the end walls of their coordinated beam sections for centering and aligning the same, comprising two annular members having a threaded engagement with each other and both bearing against the end walls of adjoining beam sections and constituting means for securing a face to face contact thereof.

In testimony whereof I affix my signature.

JOHANN JACOB KEYSER.